United States Patent
Park et al.

(10) Patent No.: US 9,410,852 B2
(45) Date of Patent: Aug. 9, 2016

(54) FREEZE INDICATOR

(71) Applicants: INTELLECTUAL DISCOVERY CO., LTD., Seoul (KR); INDITECHKOREA CO., LTD., Hwaseong-si, Gyeonggi-do (KR)

(72) Inventors: Jihoon Park, Suwon-si (KR); Gilnam Hong, Seoul (KR)

(73) Assignees: Intellectual Discovery Co., Ltd., Seoul (KR); InditechKorea Co., Ltd., Hwaseong-si (KR)

( * ) Notice: Subject to any disclaimer, the term of this patent is extended or adjusted under 35 U.S.C. 154(b) by 188 days.

(21) Appl. No.: 14/260,076

(22) Filed: Apr. 23, 2014

(65) Prior Publication Data

US 2014/0311401 A1    Oct. 23, 2014

(30) Foreign Application Priority Data

Apr. 23, 2013  (KR) .................... 10-2013-0044870

(51) Int. Cl.
| | | |
|---|---|---|
| *G01K 11/06* | (2006.01) | |
| *G01K 3/04* | (2006.01) | |
| G01K 5/02 | (2006.01) | |
| G01K 5/12 | (2006.01) | |
| G01K 11/12 | (2006.01) | |
| G01K 1/02 | (2006.01) | |

(52) U.S. Cl.
CPC ....... *G01K 11/06* (2013.01); *G01K 3/04* (2013.01); *G01K 1/02* (2013.01); *G01K 5/02* (2013.01); *G01K 5/12* (2013.01); *G01K 11/12* (2013.01); *G01K 2207/04* (2013.01)

(58) Field of Classification Search
CPC ........... G01K 11/06; G01K 1/02; G01K 1/12; G01K 5/02; G01K 5/04; G01K 5/12; G01K 3/04; G01K 2207/04

USPC ......... 116/206–207, 216–220; 374/106, 160, 374/162
See application file for complete search history.

(56) References Cited

U.S. PATENT DOCUMENTS

| | | | | |
|---|---|---|---|---|
| 3,177,843 A | * | 4/1965 | Geocaris | G01K 11/06 116/219 |
| 3,786,777 A | * | 1/1974 | Smith | G01K 11/06 116/206 |
| 3,822,189 A | * | 7/1974 | Tornmarck | G01K 3/04 374/E3.004 |
| 3,958,528 A | * | 5/1976 | Hill | G01K 11/06 116/219 |
| 4,022,149 A | * | 5/1977 | Berger | G01K 11/06 116/219 |
| 4,120,818 A | * | 10/1978 | Swindells | G01K 11/06 116/207 |
| 4,195,056 A | * | 3/1980 | Patel | G01K 3/04 116/206 |
| 4,448,548 A | * | 5/1984 | Foley | G01N 31/226 252/408.1 |
| 4,457,252 A | * | 7/1984 | Manske | G01K 11/06 116/216 |

(Continued)

FOREIGN PATENT DOCUMENTS

| | | |
|---|---|---|
| CN | 1554016 A | 12/2004 |
| EP | 0 368 263 A2 | 5/1990 |
| WO | WO 2012/066320 A2 | 5/2012 |

*Primary Examiner* — R. A. Smith
*Assistant Examiner* — Tania Courson
(74) *Attorney, Agent, or Firm* — NSIP Law

(57) ABSTRACT

Provided is a freeze indicator, and more particularly, to a freeze indicator capable of easily confirming whether products are exposed to a freezing temperature or less using a development medium member containing a development material having hydrophobic property and moisture, and using diffusion characteristics of the development material into a development medium only when the moisture is frozen at a freezing temperature or less of the moisture.

10 Claims, 7 Drawing Sheets

(56) References Cited

U.S. PATENT DOCUMENTS

| | | | | |
|---|---|---|---|---|
| 4,601,588 A * | 7/1986 | Takahara | G01K 11/16 | |
| | | | 116/207 | |
| 4,846,095 A * | 7/1989 | Emslander | G01K 11/06 | |
| | | | 116/206 | |
| 4,859,360 A * | 8/1989 | Suzuki | G01K 11/165 | |
| | | | 252/299.7 | |
| 4,998,827 A * | 3/1991 | Holzer | G01K 11/06 | |
| | | | 116/217 | |
| 5,120,137 A * | 6/1992 | Ou-Yang | G01K 3/04 | |
| | | | 116/219 | |
| 5,254,473 A * | 10/1993 | Patel | G01N 31/229 | |
| | | | 116/216 | |
| 5,964,181 A * | 10/1999 | Pereyra | G01K 11/06 | |
| | | | 116/206 | |
| 6,452,873 B1 * | 9/2002 | Holt | G04F 1/00 | |
| | | | 116/200 | |
| 6,534,006 B2 * | 3/2003 | Hehenberger | G01N 31/226 | |
| | | | 116/206 | |
| 6,694,913 B2 * | 2/2004 | Cooperman | G01K 11/06 | |
| | | | 116/206 | |
| 6,957,623 B2 * | 10/2005 | Guisinger | G01K 11/06 | |
| | | | 116/206 | |
| 7,232,253 B2 * | 6/2007 | Isbitsky | G04F 1/06 | |
| | | | 116/206 | |
| 7,343,872 B2 * | 3/2008 | Taylor | G01K 1/02 | |
| | | | 116/216 | |
| 7,891,310 B2 * | 2/2011 | Taylor | G01K 3/005 | |
| | | | 116/216 | |
| 8,122,844 B2 | 2/2012 | Smith et al. | | |
| 8,430,053 B2 * | 4/2013 | Taylor | G01K 3/005 | |
| | | | 116/206 | |
| 8,701,587 B2 * | 4/2014 | Park | G01K 3/04 | |
| | | | 116/219 | |
| 8,800,472 B2 * | 8/2014 | Park | G01K 3/04 | |
| | | | 116/219 | |

* cited by examiner (a)

(b)

[Before starting operation]

[After starting operation]

[Freezing temperature or less]

[Before starting operation]

[After starting operation]

[Freezing temperature or less]

[Before starting operation]

[After starting operation]

[Freezing temperature or less]

FREEZE INDICATOR

CROSS-REFERENCE TO RELATED APPLICATION

This application claims priority to and the benefit of Korean Patent Application No. 10-2013-0044870, filed on Apr. 23, 2013, the disclosure of which is incorporated herein by reference in its entirety.

BACKGROUND

1. Field of the Invention

The present invention relates to a freeze indicator, and more particularly, to a freeze indicator capable of easily confirming whether products are exposed to a freezing temperature or less using a development medium member containing a development material having hydrophobic property and moisture, and using diffusion characteristics of the development material into a development medium only when the moisture is frozen at a freezing temperature or less of the moisture.

2. Discussion of Related Art

As a refrigeration and freezing industry is advanced, foods and medicines that require freezing and refrigeration should be appropriately managed, and in particular, milk products, fishes and fruits that require a strict temperature management during distribution should be always maintained in a fresh state during the entire distribution process from producers to consumers. In addition, the medicines also should be maintained and managed at an appropriate storage temperature.

However, a consumer in a final consumption step can only visually determine whether the foods is in an appropriate refrigeration and freezing state in a purchase step but cannot determine whether the foods have been stored at an appropriate temperature throughout the entire distribution process. Further, a professional manager who manages distribution of refrigerated and frozen foods also cannot easily check whether the foods are distributed in a safe refrigeration and freezing state in many cases.

Accordingly, while a plurality of methods and apparatuses for checking a freezing and refrigeration state of the foods during the distribution have been disclosed, the conventional methods and apparatuses cannot precisely determine whether the products are maintained in the safe refrigeration and freezing state throughout the entire distribution process.

In order to solve the problems, various kinds of precise temperature and time indicator (TTI) (an instrument or a label attached to each of the products and configured to display temperature and time records accumulated in the product) have been developed and used.

However, the above-mentioned temperature and time indicators are mostly operated when the product is exposed to an environment of a specific temperature range or more, and there are only a few temperature and time indicators capable of confirming whether the products are exposed to the frozen state and a certain time elapses from the frozen state.

U.S. Pat. No. 8,122,844, entitled "Freeze Indicators with a Controlled Temperature Response," discloses a conventional freeze indicator.

FIG. 1 is a view schematically showing a conventional freeze indicator 1. The conventional freeze indicator 1 includes a lower substrate 2, a lower plate 6 stacked on the lower substrate 2, an upper plate 8 attached to the lower plate 6 with an adhesive agent 3, a freezing particle element 5 filled in a space disposed between the lower plate 6 and the upper plate 8, and an air bubble 7 disposed on the upper plate 8.

In the freeze indicator 1, since the air bubble 7 freely moves at a freezing temperature or more of the freezing particle element 5, it will be appreciated that the freeze indicator 1 is distributed at a freezing temperature or more, and since the freezing particle element 5 is frozen and held in a solid state at the freezing temperature or less, it will be appreciated that the product is distributed at the freezing temperature or less because the air bubble 7 is fixed to one position without moving.

However, the conventional freeze indicator 1 can only inform a user of whether products or goods to which the indicators are attached are maintained in a state of the current freezing temperature or lass, but cannot appropriately confirm whether (i) the product is exposed to the frozen state in the past and (ii) a certain time elapses from the frozen state.

Moreover, an already used conventional freeze indicator has disadvantages of (iii) a complex configuration, or (iv) precision is decreased upon an actual operation.

Accordingly, in order solve the problems of the conventional freeze indicator and further improve functions thereof, the inventor(s) has invented a freeze indicator capable of easily confirming whether products are exposed to a certain temperature or less using a development medium member containing a development material having hydrophobic property and moisture, and using diffusion characteristics of the development material into a development medium only when the moisture is frozen at a freezing temperature or less of the moisture.

SUMMARY OF THE INVENTION

In order to solve the above-mentioned problems, the present invention is directed to provide a freeze indicator including a development medium member containing a development material having hydrophobic property and moisture, and capable of easily confirming whether products are exposed to a freezing temperature or less using diffusion characteristics of the development material into a development medium only when the moisture is frozen at a freezing temperature or less of the moisture.

In addition, the present invention is also directed to provide a freeze indicator capable of starting an operation by an external pressure, expanding a portion of the upper cover by the pressure to form the second receiving section configured to accommodate the development material, and effectively bring the development material in contact with the development medium member.

Further, the present invention is also directed to provide a freeze indicator capable of easily adjusting a freezing temperature by adding other additives into the moisture, and thus, enabling application to various products and goods.

The present invention is directed to a freeze indicator including: a lower substrate; a development material member disposed on the lower substrate; a development medium member spaced apart from the development material member, disposed on the lower substrate and containing moisture; and an upper cover attached to the lower substrate and configured to block the development material member and the development medium member from the outside, wherein, when the freeze indicator starts an operation thereof, a development material is disposed around the development medium member, and the development material is diffused into the development medium member when exposed to a freezing temperature or less.

Preferably, the development material may have a hydrophobic property.

Here, the development material member may be any one or more of a type in which the development material formed of paraffin and containing a fat soluble pigment is formed in a spherical shape, and a type in which the development material formed of paraffin and containing a fat soluble pigment is filled in a gelatin capsule.

Preferably, the development medium member may be a paper containing moisture or a thin film sheet formed of silica, and may be formed of a material such that the development material is diffused into the development medium member when exposed to the freezing temperature or less.

Here, the moisture may contain other additives, and thus, the freezing temperature of the moisture may be adjusted.

Preferably, the lower substrate and the upper cover may be formed of a material that is able to seal the moisture and the development material from the outside.

Preferably, the upper cover may include a convex section that forms a first receiving section configured to accommodate the development material member, and a pressure applied from the outside may rupture the development material member through the convex section to operate the freeze indicator.

Preferably, the upper cover may further include first and second projections protruding along an outer circumferential surface of the development medium member to a certain extent, and a concave section formed between the first and second projections may expand to accommodate the development material after the freeze indicator is operated.

Preferably, the upper cover may further include an expansion section formed of an expandable material along the outer circumferential surface of the development medium member, and the expansion section may expand to accommodate the development material after the freeze indicator is operated.

Preferably, the upper cover may further include an expansion section having a relatively smaller thickness than a periphery thereof along an outer circumferential surface of the development medium member and configured to be expandable, and the expansion section may expand to accommodate the development material after the freeze indicator is operated.

Here, the upper cover may further include one or more transparent display window formed at a position corresponding to the development medium member. In addition, the upper cover may be formed of a transparent material at only the first and second projections. In particular, the first and second projections may be formed of the transparent material such that the starting of the operation of the freeze indicator is able to be seen from the outside.

According to the present invention, the development material having the hydrophobic property and the development medium member containing the moisture are provided, and characteristics of the development material diffused into the development medium only when the moisture is frozen at the freezing temperature or less are used, and thus, whether the product is exposed to the freezing temperature or less can be more precisely and easily confirmed.

In addition, according to the present invention, when the external pressure is applied to the first receiving section, the freeze indicator starts the operation, and a portion of the upper cover is expanded by the pressure to form the second receiving section. Accordingly, as the development material is accommodated in the second receiving section, the development material can effectively come in contact with the development medium member.

Further, according to the present invention, as the other additives are added to the moisture, the freezing temperature can be easily adjusted, and thus, the freeze indicator can be applied to various products and goods.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4(a) is a view showing a state before starting an operation, FIG. 4(b) is a view showing a state after starting the operation, and FIG. 4(c) is a view showing a state when exposed to a freezing temperature or less;

FIG. 5(a) is a view showing a state before starting an operation, FIG. 5(b) is a view showing a state after starting the operation, and FIG. 5(c) is a view showing a state when exposed to a freezing temperature or less;

FIG. 7(a) is a view showing a state before starting an operation, FIG. 7(b) is a view showing a state after starting the operation, and FIG. 7(c) is a view showing a state when exposed to a freezing temperature or less.

DETAILED DESCRIPTION OF EXEMPLARY EMBODIMENTS

Figure 1:
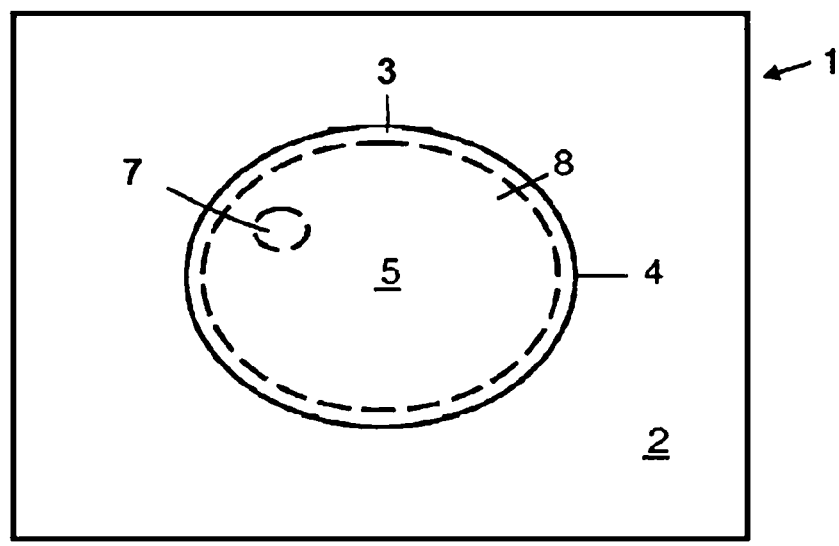
FIG. 1 is a view for schematically showing a conventional freeze indicator.
Figure 1:
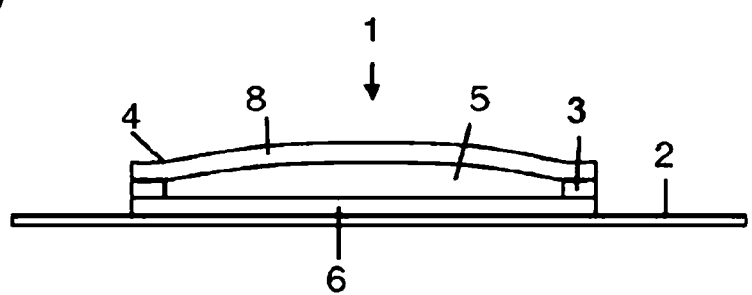

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

An exemplary embodiment of a freeze indicator according to the present invention will be described with reference to the accompanying drawings. In this regard, thicknesses of lines or sizes of components shown in the drawings may be exaggerated for the purpose of clarity and convenience of description. In addition, terms to be described are terms defined in consideration of functions in the present invention and may differ according to intensions or customs of a user or an operator. Accordingly, definitions of these terms should be described based on contents throughout the specification.

First Embodiment

Figure 2:
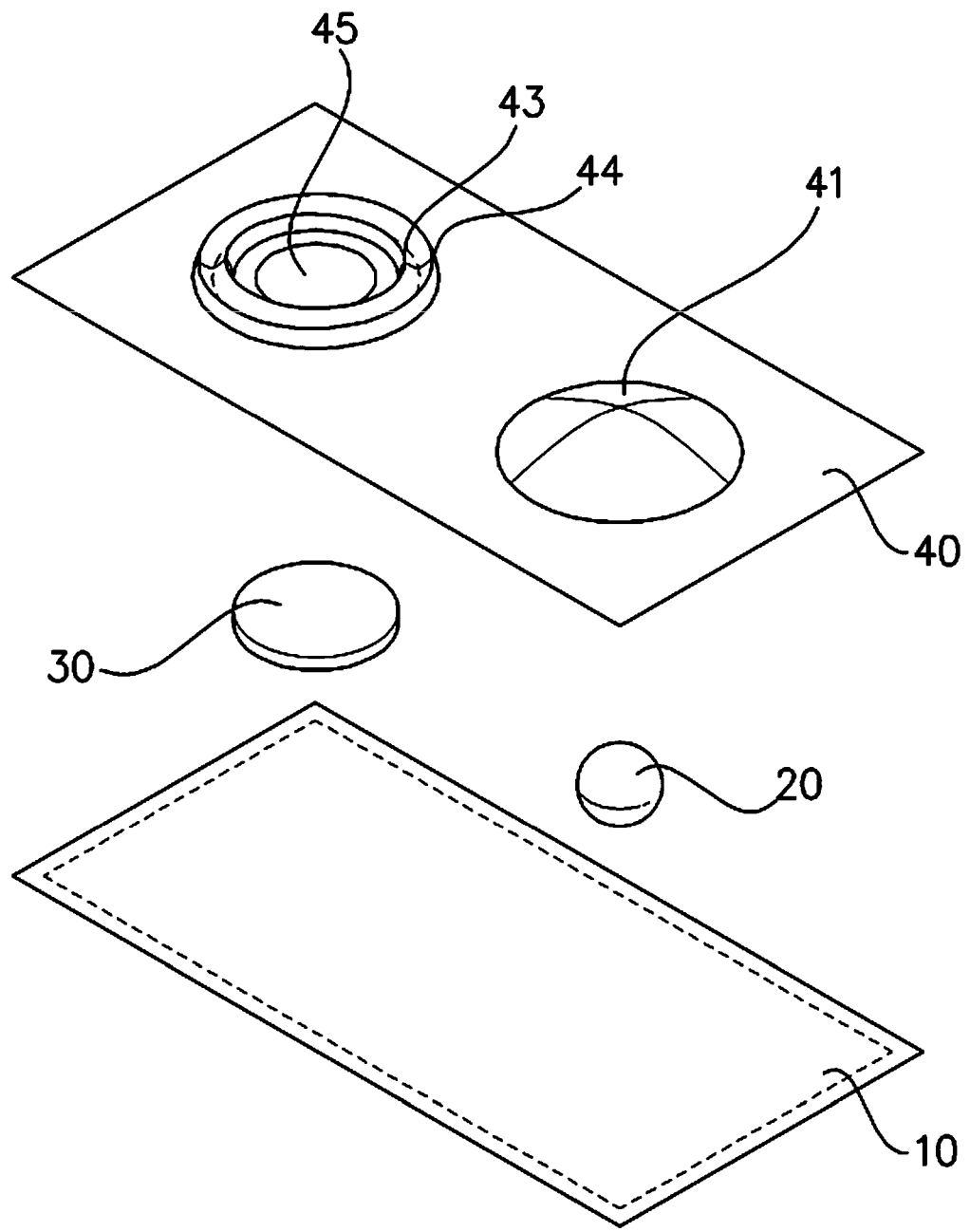
FIG. 2 is an exploded perspective view showing a freeze indicator 100 according to an embodiment of the present invention.
Figure 3:
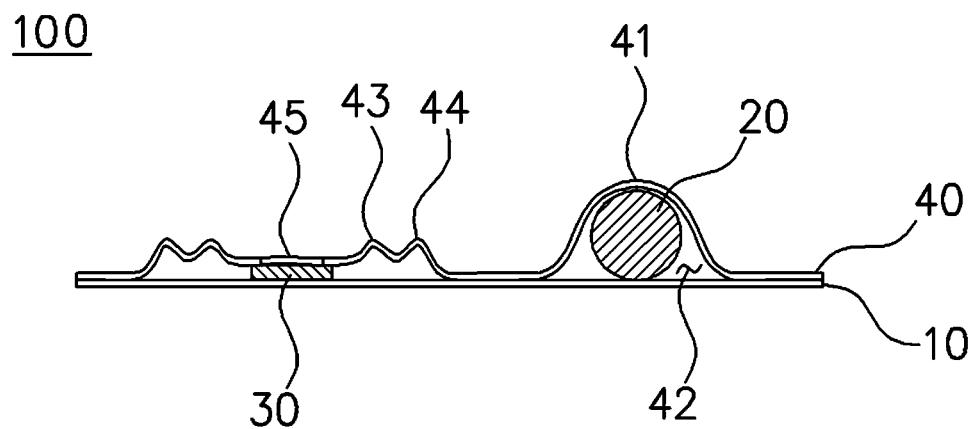
FIG. 3 is a cross-sectional view showing the freeze indicator 100 according to the embodiment of the present invention.

FIG. 2 is an exploded perspective view showing a freeze indicator 100 according to an embodiment of the present invention. FIG. 3 is a cross-sectional view showing the freeze indicator 100 according to the embodiment of the present invention. The freeze indicator 100 according to the embodiment of the present invention will be described with reference to FIGS. 2 and 3. The freeze indicator 100 according to the embodiment of the present invention includes a lower substrate 10, a development material member 20, a development medium member 30 and an upper cover 40.

The lower substrate 10 configures a lower side of the freeze indicator 100, and the development material member 20 and the development medium member 30 (to be described below) may be disposed at an upper side of the lower substrate 10.

Here, the kind of the lower substrate 10 is not limited as long as the lower substrate 10 can block and seal the development material member 20 and the development medium member 30 disposed therein from the outside.

The development material member 20 includes a development material having a hydrophobic property, and the development material is diffused on the development medium member 30 (to be described below) when exposed to a certain freezing temperature or less after the freeze indicator 100 starts an operation thereof and functions to cause the development medium member 30 to have a certain color.

A shape of the development material member 20 is not limited as long as the member 20 includes the development material. Preferably, the development material member 20 may be manufactured in various types, for example, (i) a type in which the development material formed of paraffin and containing a fat soluble pigment (for example, red) is manufactured in a spherical shape and (ii) a capsule type in which the development material formed of paraffin and containing a fat soluble pigment (for example, red) is formed in a sealed body having a spherical or other shapes using gelatin, and so on.

In addition, the kind of the development material is also not limited as long as the development material has a freezing temperature lower than that of the moisture (for example, 0° C. or less), has characteristics of water solubility, and is able to be diffused on the development medium member 30 (to be described below) at a certain temperature or less.

Here, a flowable paraffin having a freezing point of about −5° C. or less is appropriate as the development material, and various other kinds of development materials may be used according to the kinds or properties of products to which the freeze indicator 100 is to be applied.

The development medium member 30 is a paper containing moisture or a thin film sheet formed of silica, and spaced apart from the development material member 20 and attached onto the lower substrate 10 using an adhesive agent or the like.

The development medium member 30 is configured such that, (i) while the development material is not absorbed into the development medium member 30 due to extreme separability of the moisture and the development material (i.e., the development material having a hydrophobic property is to be separated from the development medium containing moisture rather than mixing) under a condition of the freezing temperature of the moisture (i.e., the freezing temperature of water, 0° C.) or more, (ii) the separability is weakened or disappeared when exposed to the freezing temperature or less (i.e., the moisture is frozen and solidified and thus the development material permeates a gap of ice crystals) so that the development material is diffused into the development medium member 30.

Here, other additives, chemicals, or the like, may be contained in the moisture, and thus, the freezing temperature of the moisture can be adjusted according to the kind or characteristics of the products to which the freeze indicator 100 is to be applied (see a phenomenon such as freezing point depression, a decrease in freezing temperature, or the like).

The upper cover 40 configures an upper side of the freeze indicator 100, and is attached to the lower substrate 10 to block the development material member 20 and the development medium member 30 from the outside.

Here, the kind of the upper cover 40 is not limited as long as the upper cover 40 blocks and seals the moisture and the development material disposed therein from the outside.

A convex section 41 protruding upward may be provided on the upper cover 40, and the convex section 41 forms a first receiving section 42 such that the upper cover 40 can accommodate the development material member 20.

In addition, a first projection 43 and a second projection 44 protruding upward to a constant level along the outer circumferential surface of the development medium member 30 may be provided on the upper cover 40, and as will be described below, the first projection 43 and the second projection 44 form a second receiving section configured to accommodate the development material leaked from the development material member 20 when the freeze indicator 100 is operated.

Here, the first projection 43 and the second projection 44 are formed of a transparent material, and thus, the freeze indicator 100 starts an operation thereof such that starting of the operation of the freeze indicator 100 can be easily seen from the outside when the development material is accommodated in the second receiving section.

Additionally, the upper cover 40 may further include one or more transparent display window 45 formed at a position corresponding to the position of the development medium member 30. As will be described below, the transparent display window 45 functions to enable a user to easily see this state from the outside when the freeze indicator 100 is exposed to the freezing temperature or less.

Meanwhile, an operational theory of the above-mentioned freeze indicator 100 will be described in more detail with reference to FIGS. 4 and 5.

Figure 4:
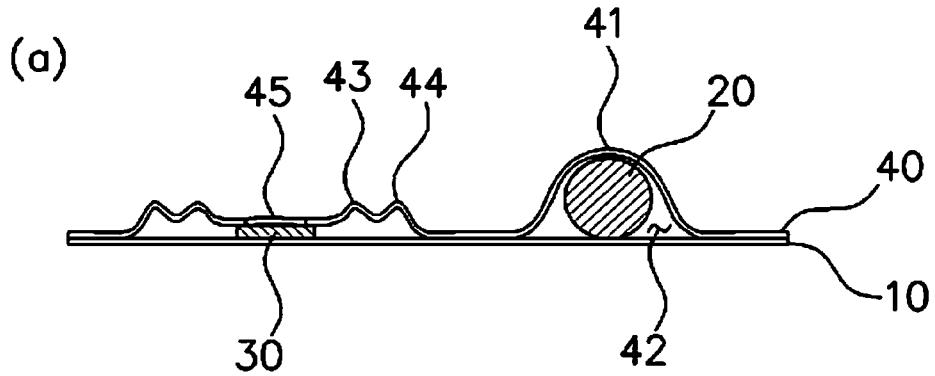
FIG. 4 is a view schematically showing states according to steps of the freeze indicator 100 according to the embodiment of the present invention.
Figure 4:
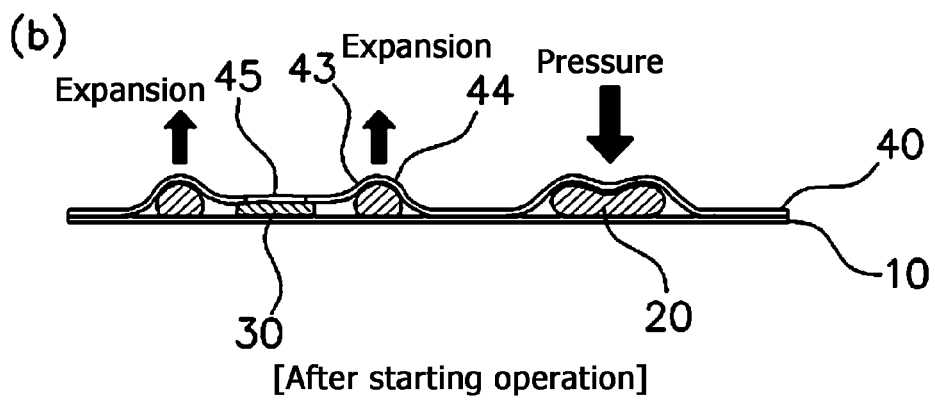
Figure 4:
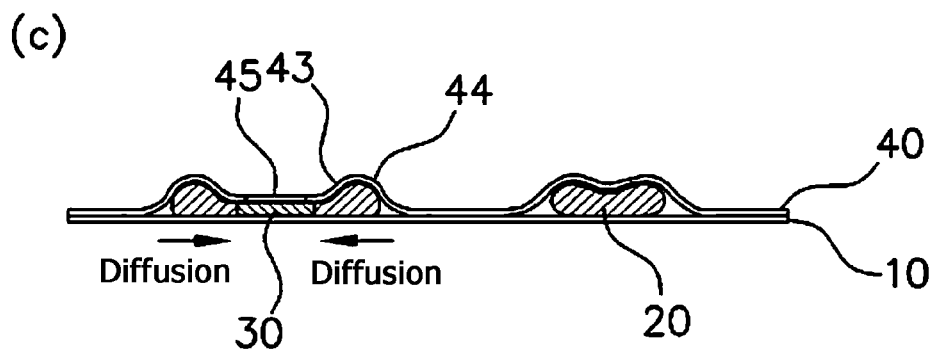
Figure 5:
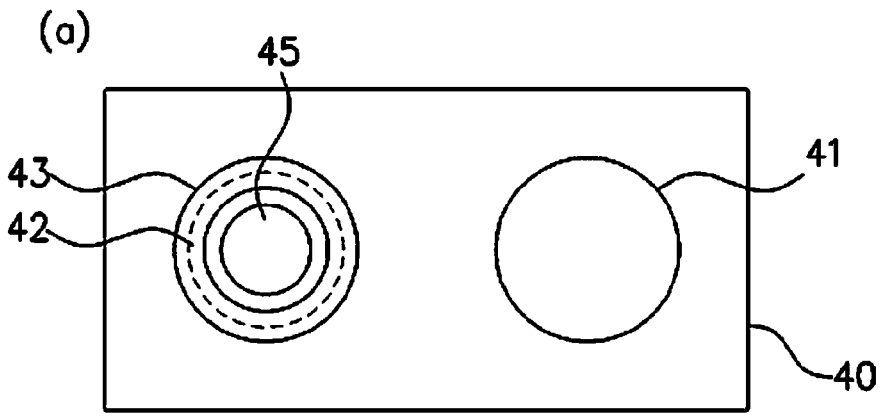
FIG. 5 is a view schematically showing states according to steps of the freeze indicator 100 according to the embodiment of the present invention.
Figure 5:
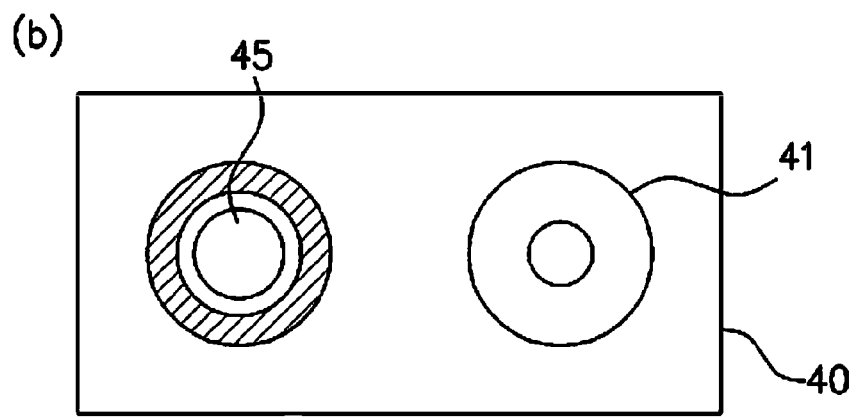
Figure 5:
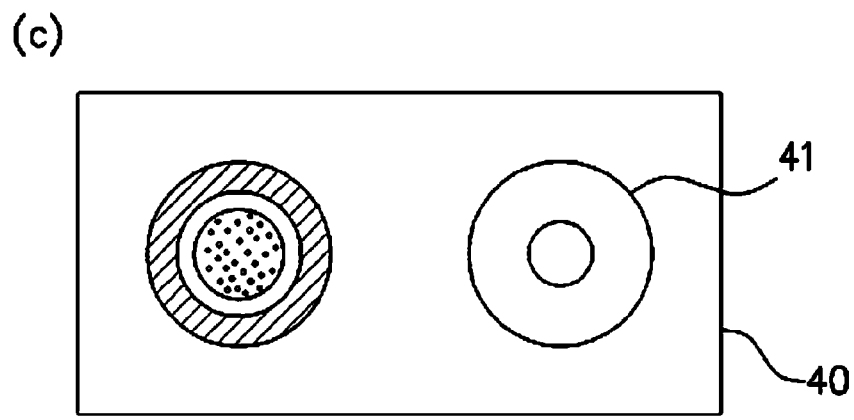

FIG. 4 is a view schematically showing states according to steps of the freeze indicator 100 according to the embodiment of the present invention. FIG. 5 is a view showing the states according to the steps of the freeze indicator 100 according to the embodiment of the present invention from above.

FIGS. 4(*a*) and 5(*a*) show states before starting an operation of the freeze indicator 100.

Before the freeze indicator 100 is operated, as described above, the development material member 20 is accommodated in the first receiving section 42, and the development medium member 30 is disposed inside the first projection 43 and the second projection 44.

Here, no variation of any color is detected through the first projection 43 or the second projection 44.

FIGS. 4(*b*) and 5(*b*) show states in which the freeze indicator 100 starts an operation thereof.

Specifically, as the pressure applied from the outside ruptures the development material member 20 through the convex section 41, the freeze indicator 100 starts the operation thereof. Then, due to the pressure applied to the convex section 41, the concave section disposed between the first projection 43 and the second projection 44 expands to accommodate the development material leaked as the development material member 20 is ruptured.

Here, when the freeze indicator 100 starts the operation thereof to accommodate the development material in the second receiving section, the starting of the operation of the freeze indicator 100 can be easily confirmed from the outside as a red color is seen through the first projection 43 and the second projection 44.

However, since the development medium member 30 contains the moisture and the development material has the hydrophobic property, the development material is disposed around the development medium member 30 but is maintained while being not diffused into the development medium member 30.

FIGS. 4(c) and 5(c) show states in which the freeze indicator 100 is exposed to the freezing temperature or less.

When the freeze indicator 100 is exposed to the freezing temperature or less, the moisture contained in the development medium member 30 is frozen, and thus, the separability is weakened or disappeared and the development material is diffused into the development medium member 30. This is because, when the water becomes ice, crystallization is performed, the development material is introduced into the gap generated due to the crystallization, and thus, the development material can be diffused into the development medium member 30.

Here, when the freeze indicator 100 starts the operation and is exposed to the freezing temperature or less, the red color is seen through the first projection 43 and the second projection 44, and further, a variation of the development medium member 30 into the red color can be seen from the outside through the display window 45.

According to the above-mentioned configuration, as the color of the development medium member 30 is confirmed through the display window 45, it is possible to more precisely and easily confirm whether the product to which the freeze indicator 100 according to the embodiment of the present invention is attached is exposed to the freezing temperature and exposed to a certain time period. In addition, as the other additives are added to the moisture contained in the development medium member 30, the freezing temperature can be easily adjusted according to a use state, and thus, the freeze indicator can be applied to various products and goods.

Further, when the external pressure is applied to the first receiving section 42, the freeze indicator 100 starts the operation and the concave section disposed between the first projection 43 and the second projection 44 is expanded by the pressure to form the second receiving section. Accordingly, the development material is accommodated in the second receiving section, and thus, the development material can effectively come in contact with the development medium member 30.

Second Embodiment

Figure 6:
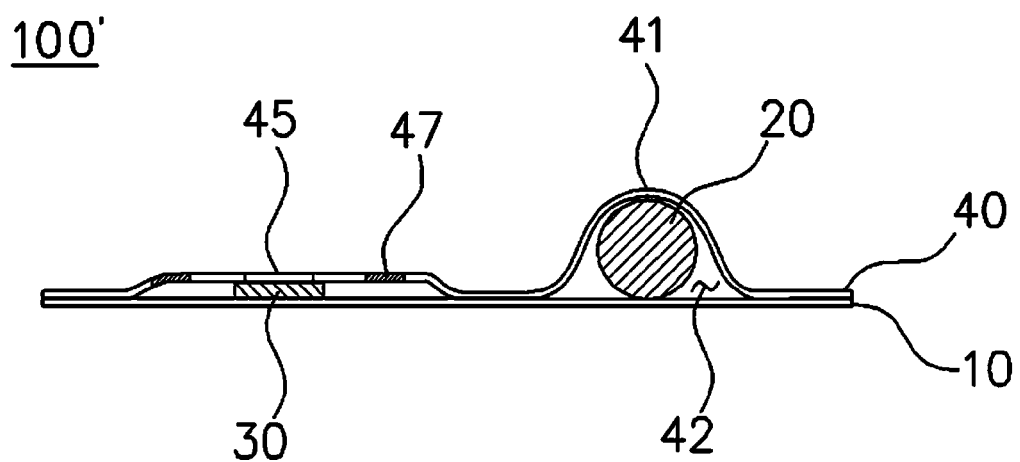
FIG. 6 is a cross-sectional view showing a freeze indicator 100' according to another embodiment of the present invention.
Figure 7:
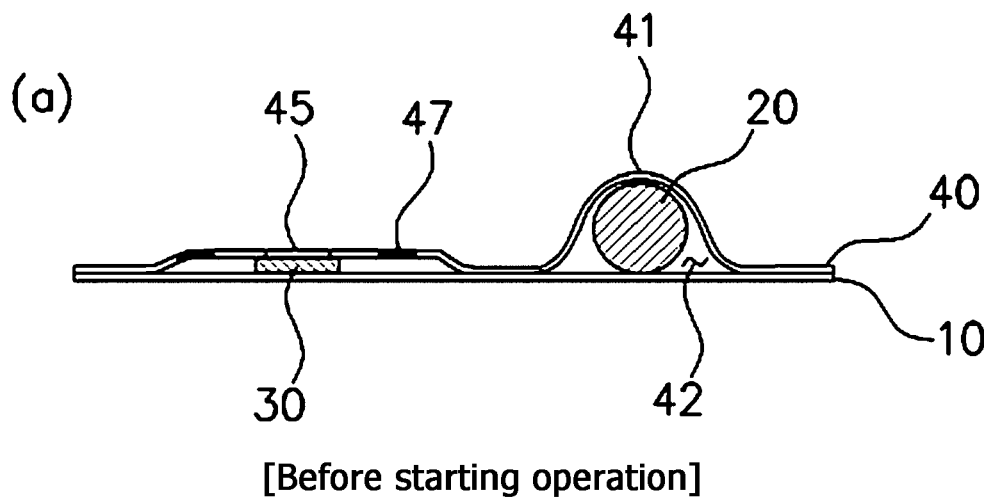
FIG. 7 is a view schematically showing states according to steps of the freeze indicator 100' according to the other embodiment of the present invention.
Figure 7:
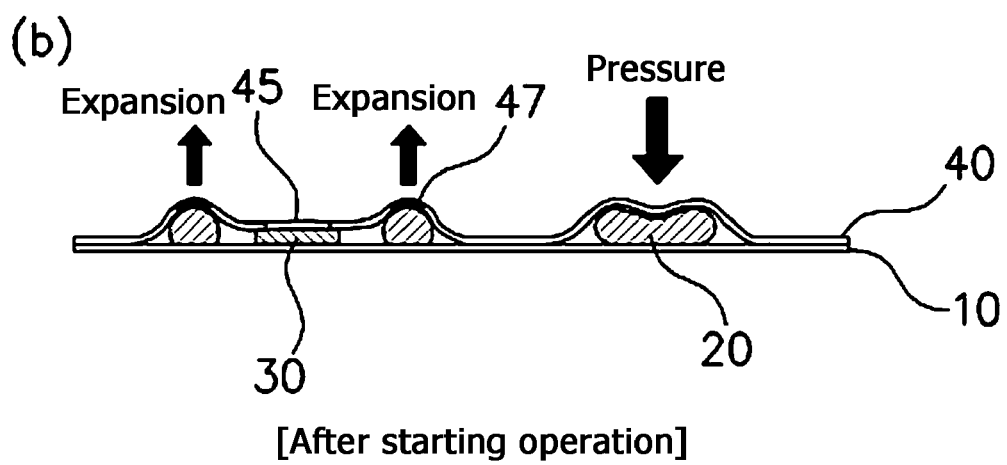
Figure 7:
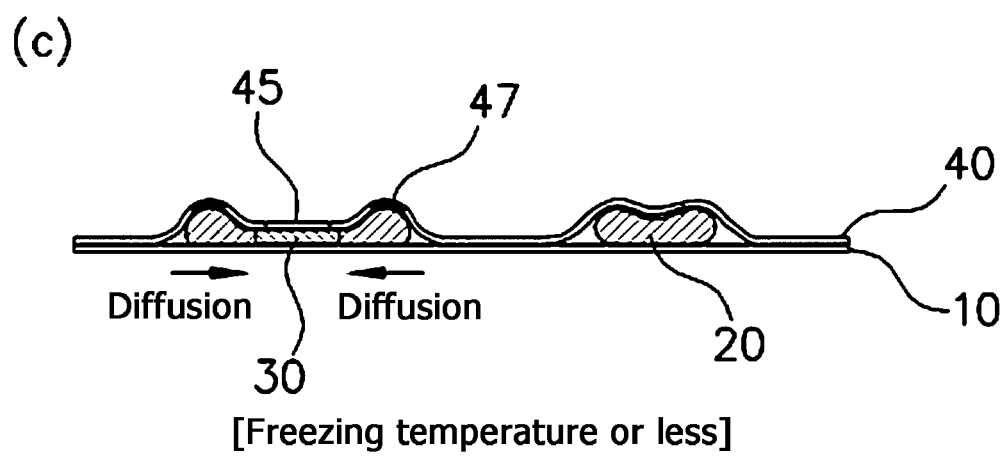

FIG. 6 is a cross-sectional view of a freeze indicator 100' according to another embodiment of the present invention. FIG. 7 is a view schematically showing states of steps of the freeze indicator 100' according to the other embodiment of the present invention.

When the freeze indicator 100' shown in FIGS. 6 and 7 is compared with the freeze indicator 100 shown in FIGS. 2 to 5, since the freeze indicator 100' includes the same components except for an expansion section 47 provided instead of the first projection 43 and the second projection 44, description thereof will be omitted.

The expansion section 47 is provided on the upper cover 40 at a position corresponding to the position spaced a certain distance from the development medium member 30 along the outer circumferential surface thereof, and in particular, the expansion section 47 is formed of an expandable material or has a relatively smaller thickness than that of the upper cover 40.

Accordingly, when the pressure is applied to the convex section 41 and the freeze indicator 100' starts the operation, the expansion section 47 is expanded due to the pressure applied to the freeze indicator 100' to form the second receiving section configured to accommodate the development material.

Here, the expansion section 47 is formed of a transparent material like the first and second projections, and when the freeze indicator 100' starts the operation thereof and the development material is accommodated in the second receiving section, the starting of the operation of the freeze indicator 100' can be easily seen from the outside.

Meanwhile, various modifications in addition to the embodiment disclosed in the specification may be configured to be applied as long as the expansion section 47 can perform the above-mentioned function.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A freeze indicator comprising:
   a lower substrate;
   a development material member disposed on the lower substrate;
   a development medium member spaced apart from the development material member, disposed on the lower substrate, and containing moisture; and
   an upper cover attached to the lower substrate, and configured to block the development material member and the development medium member from the outside,
   wherein, when the freeze indicator starts an operation thereof, a development material is disposed around the development medium member, and the development material is diffused into the development medium member when exposed to a freezing temperature or less;
   wherein the upper cover comprises a convex section that forms a first receiving section configured to accommodate the development material member, and wherein to operate the freeze indicator, a pressure is applied from the outside to rupture the development material member through the convex section; and
   wherein the upper cover further comprises first and second projections protruding along an outer circumferential surface of the development medium member, and wherein a concave section formed between the first and second projections is configured to expand to accommodate the development material after the freeze indicator is operated.

2. The freeze indicator according to claim 1, wherein the development material has a hydrophobic property.

3. The freeze indicator according to claim 1, wherein the development material member comprises a development material formed of paraffin, and comprises a fat soluble pigment that is at least one of formed in a spherical shape and filled in a gelatin capsule.

4. The freeze indicator according to claim 1, wherein the development medium member is a paper containing at least one of moisture and a thin film sheet formed of silica, and
   wherein the development medium member comprises a material configured such that the development material is diffused into the development medium member when exposed to the freezing temperature or less.

5. The freeze indicator according to claim 1, wherein the moisture comprises other additives, and thus, the freezing temperature of the moisture is adjusted.

6. The freeze indicator according to claim 1, wherein the lower substrate and the upper cover are formed of a material configured to seal the moisture and the development material from the outside.

7. The freeze indicator according to claim 1, wherein the first and second projections are formed of a transparent material configured such that the starting of the operation of the freeze indicator is seen from the outside.

8. The freeze indicator according to claim 1, wherein the upper cover further comprises:
   one or more transparent display window formed at a position corresponding to the position of the development medium member.

9. A freeze indicator comprising:
   a lower substrate;
   a development material member disposed on the lower substrate;
   a development medium member spaced apart from the development material member, disposed on the lower substrate, and containing moisture; and
   an upper cover attached to the lower substrate and configured to block the development material member and the development medium member from the outside,
   wherein, when the freeze indicator starts an operation thereof, a development material is disposed around the development medium member, and the development material is diffused into the development medium member when exposed to a freezing temperature or less;
   wherein the upper cover comprises a convex section that forms a first receiving section configured to accommodate the development material member, and wherein to operate the freeze indicator, a pressure is applied from the outside to rupture the development material member through the convex section; and
   wherein the upper cover further comprises an expansion section formed of an expandable material along the outer circumferential surface of the development medium member, and wherein the expansion section is configured to expand to accommodate the development material after the freeze indicator is operated.

10. The freeze indicator according to claim 9, wherein the upper cover further comprises:
    one or more transparent display window formed at a position corresponding to the position of the development medium member.

* * * * *